United States Patent [19]

Brown

[11] 4,245,782

[45] Jan. 20, 1981

[54] FUSIBLE LINKAGE AQUATIC DEVICE THAT WILL OVERRIDE THE FAILURE OF A DEFECTIVE THERMOSTAT OR THE LIKE WITHIN A MOTOR

[76] Inventor: George Brown, 317 S. Harbor Dr., Venice, Fla. 33595

[21] Appl. No.: 46,060

[22] Filed: Jun. 6, 1979

[51] Int. Cl.³ .............................................. F01P 7/02
[52] U.S. Cl. ..................................... 236/34.5; 137/73; 236/DIG. 2
[58] Field of Search .................. 236/34, 34.5, DIG. 2; 137/72–74; 169/42

[56] References Cited

U.S. PATENT DOCUMENTS

| | | | |
|---|---|---|---|
| 2,674,324 | 4/1954 | Mascarini | 137/72 X |
| 3,045,918 | 7/1962 | Woods | 236/34 |
| 3,289,686 | 12/1966 | Tyer, Jr. | 137/73 |
| 3,498,537 | 3/1970 | Wong | 236/34 |
| 3,558,046 | 1/1971 | Kelly | 236/34 |
| 3,776,457 | 12/1973 | Cardi | 236/34.5 |
| 4,014,388 | 3/1977 | Anderson | 169/42 X |
| 4,066,129 | 1/1978 | Anderson | 169/42 X |

*Primary Examiner*—Albert J. Makay
*Assistant Examiner*—William E. Tapolcai, Jr.

[57] ABSTRACT

A controlled device within the liquid chamber of a motor, to prevent the override of temperature from a predetermined temperature setting if thermostatic failure should occur within the liquid chamber of a motor.

3 Claims, 5 Drawing Figures

FUSIBLE LINKAGE AQUATIC DEVICE THAT WILL OVERRIDE THE FAILURE OF A DEFECTIVE THERMOSTAT OR THE LIKE WITHIN A MOTOR

BACKGROUND OF THE INVENTION

The present invention relates to the boiling over of a motor and more particularly, due to thermostatic failure.

Heretofore many overheating problems within water or other liquid cooled motors, were due to the breakdown of the thermostat which restricts the flow of the cooling liquid.

Accordingly, a need has arisen for a new and improved thermostat that would not shut down a motor due to thermostatic failure.

SUMMARY OF THE INVENTION

The present invention fulfills this need by overriding the existing defective thermostat. When failure of the thermostat mechanism occurs, and restricts the flow of cooling liquid through the motor and cooling system, a fusible metal within a linkage melts, releasing a tension spring, which opens the flow of liquid through the previously closed defective thermostat and allows the cooling liquid to flow through the motor and cooling system.

DESCRIPTION OF THE PREFERRED EMBOIDMENT

This invention relates to the design and fabrication of a fusible linkage device which is very useful for protection of any motor with a thermostatic liquid temperature control where there is a possiblity of thermostat failure and the direct shut-off of liquid circulation to the motor. This device will function as a protective control. It operates automatically. It is completely hybrid in form and does not occupy any additional space as it is installed within the thermostat control itself and does not restrict the flow of liquid. The key to a safe fusible linkage aquatic device is in its construction.

This fusible linkage aquatic device comprises a fuse or fusible link ($FL_1$), springs ($S_1$) and disks ($P_1$) and ($P_2$). The fuse ($FL_1$) is the typical (In), (Bi), (Sn) formula and/or (Cd), (Bi), (Pb) formula or other chemical formulas to obtain the desired melting point for the activation of the fusible linkage to put the fusible linkage aquatic device into operation by releasing the higher tension spring ($S_1$), to override thermostat spring ($S_2$), thereby forcing the full flow of cooling liquid to circulate throughout the motor cooling system. The liquid supply flow will be constant without any loss of volume or pressure. This fusible linkage aquatic device can easily be manufactured. This fusible linkage aquatic device can also be adapted into existing thermostats that do not have this protective feature.

The accompanying drawing demonstrates the technique used by this inventor. The key to achieving a safe fusible aquatic device is in its construction. The parts used were manufactured by the inventor. Thus, with a minimum of components, a safe fusible linkage aquatic device performed its function well, dropping the temperature well within the safe temperature range.

At that fixed high point of temperature, that is programmed to melt the fusible linkage ($FL_1$), the device is activated, and spring ($S_1$) pushes disk ($P_2$) against the defective thermostatic controlled plunger ($PL_1$) to the extent that it causes the plunger in the aquatic thermostatic device to open full ($OF_1$), permitting a full flow of liquid throughout the motor cooling system. In the normal operating position the spring ($S_1$) of the fusible linkage aquatic device is held in compression by the fusible link ($FL_1$) and the disks ($P_1$) and ($P_2$). The fusible linkage ($FL_1$), holds the spring in compression until it is activated by the excessive hot liquid temperature which melts the fusible linkage ($FL_1$) when the thermostat fails to operate.

Figure 1:
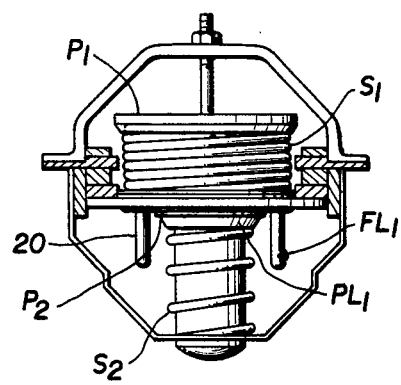
FIG. 1 is a side elevational view, partly in section, of the device of the present invention, showing the spring held in compression by the fusible linkage.
Figure 2:
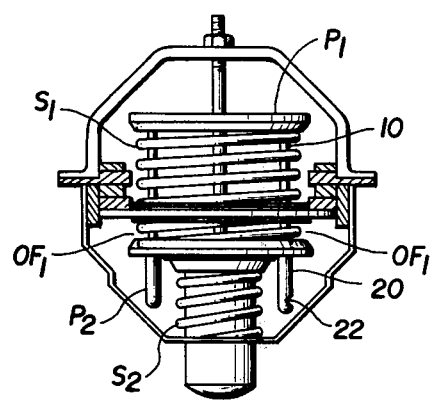
FIG. 2 is a side elevational view similar to FIG. 1, showing the fusible linkage and spring in released positions.
Figure 3:
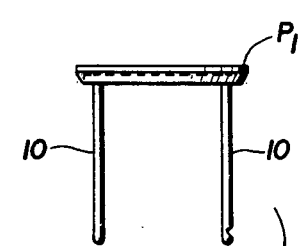
FIG. 3 is an exploded view in side elevation of the spring and disks of the device of the present invention.
Figure 3:
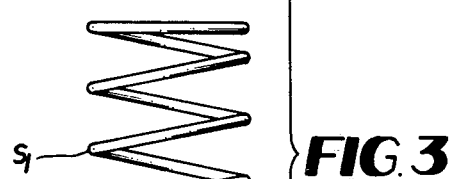
Figure 4:
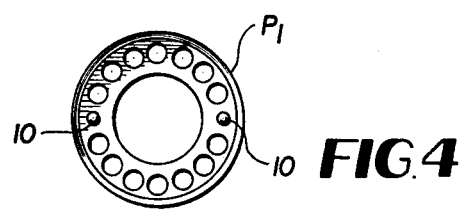
FIG. 4 is a plan view of one of the disks of the present device.
Figure 5:
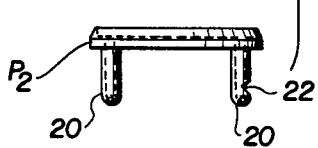
FIG. 5 is a plan view of the other disk of the present device.
Figure 5:
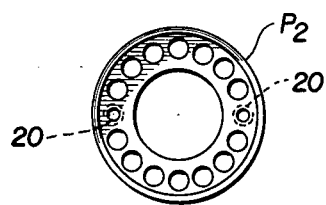

As shown in FIGS. 1-3, the disk $P_1$ comprises a pair of depending legs 10 which are positioned to be slidably or telescopically received within the hollow depending legs 20 of the disk $P_2$. The fusible link $FL_1$ serves to connect one of the legs 10 of disk $P_1$ to the adjacent leg 20 of disk $P_2$ in the manner illustrated in FIG. 1. This can be accomplished in any suitable manner such as the provision of an opening 22 (FIG. 2) in one of the legs 20 of disk $P_2$ which enables the fusible link $FL_1$ to contact the adjacent portions of the leg 20 and the leg 10 inserted therein.

What is claimed is:

1. A device for opening an inoperative thermostat or the like in a liquid cooling system, the thermostat having a plunger, said device comprising:

spring means for urging the plunger to an open position, and means for restraining the opening force of said spring means, said restraining means comprising a first member in engagement with one end of said spring means and a second member in engagement with the other end of said spring means, and fusible means connecting said first and second members to maintain said spring in a compressed condition, said fusible connecting means serving to release said spring means when exposed to a predetermined temperature of the cooling liquid to enable said spring means to move said plunger to said open position.

2. The device of claim 1 wherein each of said first and second members is a disk with a leg extending therefrom, the leg of said first disk being joined to the leg of said second disk by said fusible connecting means.

3. The device of claim 2 wherein the leg of said second disk is hollow and the leg of said first disk is received within the leg of said second disk.

* * * * *